(12) United States Patent
Szilágyi et al.

(10) Patent No.: US 10,243,860 B2
(45) Date of Patent: Mar. 26, 2019

(54) METHOD AND APPARATUS FOR END-TO-END QOS/QOE MANAGEMENT IN 5G SYSTEMS

(71) Applicant: Nokia Technologies Oy, Espoo (FI)

(72) Inventors: Péter Szilágyi, Budapest (HU); Csaba Vulkán, Budapest (HU)

(73) Assignee: NOKIA TECHNOLOGIES OY, Espoo (FI)

( * ) Notice: Subject to any disclaimer, the term of this patent is extended or adjusted under 35 U.S.C. 154(b) by 18 days.

(21) Appl. No.: 15/478,856

(22) Filed: Apr. 4, 2017

(65) Prior Publication Data
US 2017/0289047 A1    Oct. 5, 2017

Related U.S. Application Data

(60) Provisional application No. 62/318,568, filed on Apr. 5, 2016.

(51) Int. Cl.
| | | |
|---|---|---|
| *H04L 12/26* | (2006.01) | |
| *H04L 12/813* | (2013.01) | |
| *H04L 12/803* | (2013.01) | |
| *H04L 12/24* | (2006.01) | |
| (Continued) | | |

(52) U.S. Cl.
CPC .............. *H04L 47/20* (2013.01); *H04L 41/12* (2013.01); *H04L 43/08* (2013.01); *H04L 47/125* (2013.01); *H04L 47/2416* (2013.01); *H04W 28/16* (2013.01)

(58) Field of Classification Search
None
See application file for complete search history.

(56) References Cited

U.S. PATENT DOCUMENTS

| | | | |
|---|---|---|---|
| 9,179,007 B1 | 11/2015 | Yadva et al. | |
| 2012/0327779 A1* | 12/2012 | Gell | H04L 47/2475 370/238 |

(Continued)

OTHER PUBLICATIONS

International Search Report and Written Opinion for corresponding International Application No. PCT/IB2016/052079, dated Jan. 2, 2017.

(Continued)

*Primary Examiner* — Anh Vu H Ly
(74) *Attorney, Agent, or Firm* — Alston & Bird LLP

(57) ABSTRACT

Various methods are provided for providing dynamic and adaptive QoS and QoE management of U-Plane traffic while implementing user and application specific differentiation and maximizing system resource utilization by, for example, providing utilizing a system comprised of a policy server and one or more enforcement points. In one example system, the policy server may be a logical entity configured for storing a plurality of QoS/QoE policies, each of the plurality of policies identifying at least one of a user, service vertical, application, or context, and associated QoE targets. The policy server may be further configured to provide one or more of the plurality of QoS/QoE policies to the one or more enforcement points. In some embodiments, the QoS/QoE policies may be configured to provide QoE targets, for example, at a high abstraction level and/or at an application session level.

21 Claims, 8 Drawing Sheets

(51) Int. Cl.
  *H04L 12/853* (2013.01)
  *H04W 28/16* (2009.01)

(56) References Cited

U.S. PATENT DOCUMENTS

| | | | | |
|---|---|---|---|---|
| 2013/0086279 | A1* | 4/2013 | Archer | H04L 69/14 709/233 |
| 2013/0143542 | A1 | 6/2013 | Kovvali et al. | |
| 2013/0301415 | A1* | 11/2013 | Archer | H04W 28/08 370/235 |
| 2015/0009826 | A1* | 1/2015 | Ma | H04W 28/0268 370/235 |
| 2016/0057028 | A1* | 2/2016 | Smith | H04L 43/08 370/252 |
| 2016/0174120 | A1* | 6/2016 | Zembutsu | H04W 36/165 370/328 |
| 2017/0244777 | A1* | 8/2017 | Ouyang | H04L 65/80 370/328 |
| 2017/0289047 | A1* | 10/2017 | Szilagyi | H04L 47/20 370/328 |
| 2017/0295105 | A1* | 10/2017 | Yu | H04L 47/2483 370/328 |
| 2017/0325120 | A1* | 11/2017 | Szilagyi | H04W 28/0268 370/328 |
| 2018/0026896 | A1* | 1/2018 | Szilagyi | H04L 47/24 370/328 |

OTHER PUBLICATIONS

*Nokia Networks Cell load and application-aware traffic management*, Nokia Networks white paper, [online] [retrieved Jul. 13, 2017]. Retrieved from the Internet: <URL: https://resources.ext.nokia.com/asset/200041> 20 pages.

ETSI GS NFV-MAN 001 v1.1.1, Network Functions Virtulisation (NFV); Management and Orchestration, (2014), Retrieved from the Internet: <URL: http://www.etsi.org/deliver/etsi_gs/NFV-MAN/001_099/001/01.01.01_60/gs_nfv-man001v010101p.pdf>. 184 pages.

* cited by examiner

METHOD AND APPARATUS FOR END-TO-END QOS/QOE MANAGEMENT IN 5G SYSTEMS

CROSS-REFERENCE TO RELATED APPLICATIONS

This application claims benefit under 35 USC 119 (e) of U.S. provisional Application No. 62/318,568, filed Apr. 5, 2016, and PCT Application No. PCT/IB2016/052079 filed Apr. 12, 2016, the entire contents of both incorporated herein by reference.

TECHNOLOGICAL FIELD

Embodiments of the present invention relate generally to providing an end-to-end QoS/QoE management architecture for 5G systems as well as a method, apparatus, and computer program product for facilitating dynamic, adaptive and flexible QoS/QoE management for implementing user/application specific differentiation to maximize customer experience and system resource utilization while providing an efficient congestion management mechanism capable of resolving radio and transport congestion.

BACKGROUND

In addition to today's over-the-top ("OTT") and traditional telecommunication service verticals provided by mobile operators, 5G systems are expected to support emerging use cases with specific and sometimes critical Quality of Service ("QoS") requirements such as Internet of Things ("IoT") (including mission critical mobile-to-mobile ("M2M")), vehicle-to-vehicle/-infrastructure (V2X) communication, tactile Internet (such as remote factory/robotics control or augmented reality), smart buildings, sensor networks, etc.

OTT applications generate the dominant share of today's mobile broadband traffic and are expected to continue as a major use case in the 5G era as well. Popular applications include web browsing, video streaming (e.g., YouTube, Netflix, Hulu, etc.), navigation (e.g., Waze, Google Maps, etc.), social sites (e.g., Facebook, etc.), OTT real time voice/video (e.g., Skype, Viber, WhatsApp, etc.), instant messaging, gaming, productivity, etc. The OTT applications have highly dynamic traffic profiles and as such may establish many flows per application with short lifetime and wide service boundary. Accordingly, their QoS/QoE requirements (e.g., throughput intensive, low latency, etc.) may vary highly, with orders of magnitude differences between the amount of bandwidth required for good QoE per application session. Each application session is unique, thus the required QoE may also depend on the way the user behaves and/or interacts with the application. Therefore, predefined QoE requirements are only partly applicable. That is, the session specific QoE requirements should be created according to the actual context using the predefined high level requirements defined by the operator.

The QoS architecture of the current mobile networks (3G, Wideband Code Division Multiple Access ("WCDMA")/ High Speed Packet Access ("HSPA"), Long Term Evolution ("LTE"), LTE Advanced ("LTE-A")) have been designed without the capability of fulfilling the above expectations for OTT applications or the emerging service verticals.

On the one hand, the QoS architecture is radio centric with enforcement points located at the Radio Access Network ("RAN") (e.g., LTE eNB or 3G RNC/BTS). This was based on the assumption that the capacity of the radio access is limited compared to the mobile backhaul transport network thus packet queuing and resource management (that defines the QoS) happens in the RAN.

In contrast, the policy framework is placed in the core (based around the Policy and Charging Rules Function ("PCRF")/Policy and Charging Enforcement Function ("PCEF") elements) with the purpose of enforcing subscriber specific limitations and subscription boundaries irrespective of the available resources and congestion status either at the RAN or on the mobile backhaul ("MBH"). Application awareness within policies is limited and mostly applied for content filtering (e.g., parental control) or coarse throttling of specific user plane flows.

Initially, the policy framework has lacked both the insight (QoE, congestion status, flows sharing the same resources) and the apparatus (context based resource management and application scheduling) required for dynamic QoS/QoE enforcement. Lately, the UPCON (i.e. the IEEE Uttar Pradesh Section Conference on Electrical, Computer and Electronics) activity has been established to import congestion awareness to the policy framework via proprietary signaling from the RAN to the PCRF that enables the enforcement of congestion based rules. Still, this signaling is non-real time (i.e., enforcement may miss the critical time window for meaningful actions) as well as lacks context information (congested resource and UE level status) required for dynamically calculated QoE friendly actions. Therefore, the UPCON congestion information acts yet another dynamic trigger for statically defined rules valid during congestion.

BRIEF SUMMARY

In particular, existing systems have the following limitations:

Granularity problem: Traffic differentiation is based on data bearers that usually aggregate all traffic of a given UE, regardless of the diverse requirements of the simultaneously running different applications.

Dynamicity problem: The QoS parameters of the bearers are statically configured and signaled during attachment and remain unchanged during the lifetime of the data connection. ( QoS descriptor problem: The low level QoS parameters (e.g., relative priority, delay budget, GBR, etc.) are not suitable to capture the service requirements of the dynamic OTT applications such as, for example, a per application session bandwidth requirement.

Insight problem: The QoS architecture has no insight into and awareness of the applications, their resource demand and the customer experience; therefore, the target of the QoS architecture is to enforce static QoS parameters that might lead to good QoE but only by chance.

End-to-end harmonization problem: The radio QoS architecture (bearer based QoS) and the transport network QoS architecture (DiffServ/DSCP aggregate based QoS) have entirely different resource allocation schemes and provide different service to the U-plane flows depending on whether the radio scheduler or the transport network enforces the QoS in end-to-end.

In this regard, areas for improving known and existing systems have been identified. Through applied effort, ingenuity, and innovation, solutions to improve such systems have been realized and are described in connection with embodiments of the present invention.

In particular, the 5G QoS/QoE architecture should support fully dynamic, context aware, end-to-end actions by applying and interpreting policies for the actual user, traffic and network scenario, such that policies define high level priorities, targets or user/UE level rules that are adapted and executed dynamically by the enforcement points.

The above considerations mandate a dynamic, flexible QoS/QoE architecture that is able to detect the applications and their associated QoS/QoE requirements and adapt the end-to-end resource allocation and the U-plane services accordingly thus enabling good customer experience. The emerging service verticals (e.g., IoT, V2X, M2M, tactile, etc. described above) may require rather specific service taking into account security, availability, reliability, multi-/local-connectivity, resiliency, mobility, latency, etc. requirements as well.

This invention defines the components, roles and interfaces of a 5G QoS/QoE architecture. The scope of the 5G QoS/QoE architecture is to achieve dynamic, adaptive and flexible QoS/QoE management that implements user/application specific differentiation to maximize the customer experience and at the same time the system resource utilization (radio, transport, HW, virtual resources). The architecture itself acts as an efficient congestion management mechanism capable of resolving radio and transport congestion as well. Therefore, as opposed to the 3GPP QoS architecture adopted for HSPA and LTE that is primarily based on application and context agnostic policy and QoS enforcement, the proposed 5G QoS/QoE architecture targets harmonized end-to-end QoE and QoS management capability. This includes policy and application/service specific QoE and/or QoS enforcement at each relevant network element.

In some embodiments, an end-to-end QoS/QoE management architecture for 5G systems is introduced, the scope of the end-to-end QoS/QoE management architecture for 5G systems is not to define the 5G architecture itself (e.g., protocol layers, radio access technology, network elements and functions, etc.) but rather to specify the enablers, mechanisms, functions and architectural components required for dynamic, flexible and self-configurable QoS/QoE aware operation. In some embodiments, the QoS/QoE management architecture may be designed to handle the diverse traffic demand generated by services ranging from legacy telecommunication services through currently dominant OTT, to new services such as IoT, V2X and Tactile Internet. As used herein, the term QoE management refers to a functionality that may include the common QoS management functions as applied in today's mobile systems but also extends their capability in order to maximize the user experience. Accordingly, the QoE management functionality may be a QoS management functionality also.

On the 5G U-plane, the Service Flow (SF) is a concept of a logical connectivity of a given UE to a specific service vertical (e.g., OTT or V2X). The SF is established via C-plane signaling and realized as a U-plane tunnel between the 5G radio access and the core network (similarly to the current LTE data bearer concept). Additionally, Sub-Service Flows (SSF) may also be defined in 5G to enable a more granular U-plane service/flow differentiation. A SSF may correspond to one SF and be a logical separation carrying a subset of the traffic of the SF that requires dedicated QoS/QoE treatment. Embodiments described herein build on this 5G concept to embed/attach QoS/QoE management specific components to it.

When references are made to the 5G architectural components, the top radio protocol layer is called NCS (Network Convergence Sub-layer, the 5G equivalent and extension of LTE PDCP); 5G radio nodes are referred to as 5G APs (Access Points); 5G U-plane gateway nodes are termed uGW. Interfaces S1*, Uu*, X2* indicate similar relationship as their LTE counterparts (S1, Uu and X2). Nevertheless, these naming conventions are only informational and the QoS/QoE architecture are applicable to any alternative naming or architectural definition as well.

In some embodiments, a system configured to provide dynamic and adaptive quality of service (QoS) and Quality of Experience (QoE) management of traffic while implementing user and application specific differentiation and maximizing system resource utilization may be provided, the system comprising a policy server, and one or more enforcement points. In some embodiments, the policy server may be a logical entity configured for storing a plurality of QoS/QoE policies, each of the plurality of policies identifying at least one of a user, service vertical, application, or context, and associated QoE targets, and providing one or more of the plurality of QoS/QoE policies to the one or more enforcement points. In some embodiments, the QoS/QoE policies are configured to provide, at a high abstraction level and at an application session level, QoE targets. In some embodiments, the one or more enforcement points are configured for autonomously collecting information indicative of a current network context and a network status, and autonomously and individually interpreting the QoS/QoE policies, and applying the QoS/QoE policies to the current network context without having to define a specific policy for each potential context. In some embodiments, at least one of the one or more enforcement points is located in the core network ("core side enforcement points"), in the radio access network (RAN) ("radio side enforcement points"), or in both the core network and the RAN. In some embodiments, the one or more enforcement points comprise an interface with the policy server configured for policy transfer from the policy server to the enforcement points.

In some embodiments, the one or more enforcement points located in the core network and RAN comprise an interface configured for policy forwarding from the core network to the RAN.

In some embodiments, the radio side enforcement points comprise an interface with one or more other radio side enforcement points configured for (a) context and policy transfer during handover and (b) enhanced QoS/QoE enforcement. In some embodiments, the one or more enforcement points are configured to manage one or more of the RAN, transport network or virtual resources to enable QoS/QoE enforcement. In some embodiments, the one or more enforcement points comprise an interface with the RAN configured to (a) collect radio insight to enhance QoS/QoE enforcement operation, or (b) to dynamically program the radio operation to support the QoS/QoE enforcement operation. In some embodiments, the one or more enforcement points comprise an interface with the radio resource management ("radio C-plane") configured to perform QoS/QoE management or insight, application, or network driven radio resource management.

In some embodiments, the one or more enforcement points comprise an interface with traffic steering or traffic offload entities configured to support application or insight based traffic steering. In some embodiments, the one or more enforcement points comprise an interface with the RAN configured to support application or insight based radio layer multi-connectivity.

In some embodiments, the one or more enforcement points are configured for handling the traffic in a current configuration, the traffic comprised of one or more service flows, detecting, while handling the traffic, an indication of a condition for which specific QoS and QoE management is required, wherein the condition comprises one of a change in the traffic or a change in resources or a status of the resources serving the traffic, defining at least one QoE/QoS target for each set of service flows requiring the QoS and QoE management, and in an instance in which the at least one QoE/QoS target requires a service different than a service provided in the current configuration, causing establishment of a sub-service flow configured to provide the service required by the at least one QoE/QoS target and further configured to carry a subset of the set of service flows requiring the specific QoS and QoE management In some embodiments, specific QoS and QoE management comprises identification and enforcement of a first policy of a plurality of policies, each of the plurality of policies comprising a particular set of one or more QoE parameters and associated values or ranges for the one or more QoE parameters, the one or more QoE parameters of each particular set being specific to a type of the traffic subject to the QoS and QoE management, the values or ranges, when enforced, ensuring good experience for an application or service vertical to which the values or ranges apply.

In some embodiments, the defining the at least one QoE/QoS target for each set of service flows requiring the QoS and QoE management further comprises accessing the particular set of one or more QoE parameters corresponding to the first policy and the associated values or ranges of the one or more QoE parameters, and identifying a specific value, from the associated values or ranges, for each of the one or more QoE parameters based on attributes or content of the service flow requiring the QoS and QoE management and attributes or content of the service flows competing for available capacity.

In some embodiments, causing establishment of the sub-service flow further comprises detecting whether the specific value of any of the one or more QoE parameters is unable to be met by a QoS level of the current configuration, and in in an instance in which the specific value of any of the one or more QoE parameters is unable to be met by the QoS level of the current configuration, causing establishment of a sub-service flow to carry the portion of the service flow for which the current configuration does not meet the specific value.

In some embodiments, the enforcement points are further configured for accessing the policy server before or subsequent to detection of the indication of the condition, and obtaining a set of policies, the set of policies comprising policies that describe default service to be applied on the traffic and one or more conditions requiring non-default service for a subset of the traffic.

In some embodiments, the condition is any of an establishment of a new service flow based on execution of an application, a change to an existing service flow based on a change in a type of interaction with a pre-executed application, congestion within the available resources, or a change in a service flow or set of service flows associated with a different device.

In some embodiments, the enforcement points are further configured for terminating the sub-service flow in an instance in which the subset of the set of service flows requiring the specific QoS and QoE management is no longer needed. In some embodiments, the enforcement points are further configured for identifying a set of flows that are subject of a given policy and requiring the QoS and QoE management. In some embodiments, the traffic is carried on the U-Plane.

In some embodiments, a method may be provided for providing dynamic and adaptive quality of service (QoS) and Quality of Experience (QoE) management of traffic while implementing user and application specific differentiation and maximizing system resource utilization, the method comprising accessing, by one or more enforcement points, a policy server, the policy server being a logical entity configured for storing a plurality of QoS/QoE policies, each of the plurality of policies identifying at least one of a user, service vertical, application, or context, and associated QoE targets, to receive one or more of the plurality of QoS/QoE policies to the one or more enforcement points, wherein the QoS/QoE policies are configured to provide, at a high abstraction level and at an application session level, QoE targets, autonomously collecting information indicative of a current network context and a network status, and autonomously and individually interpreting the QoS/QoE policies, and applying the QoS/QoE policies to the current network context without having to define a specific policy for each potential context.

In some embodiments, at least one of the one or more enforcement points is located in the core network ("core side enforcement points"), in the radio access network (RAN) ("radio side enforcement points"), or in both the core network and the RAN. In some embodiments, the method may further comprise utilizing an interface with the policy server to perform policy transfer from the policy server to the enforcement points. In some embodiments, the method may further comprise, in an instance in which the one or more enforcement points is located in the core network and RAN, utilizing an interface to perform policy forwarding from the core network to the RAN.

In some embodiments, the method may further comprise, in an instance in which the radio side enforcement points comprise an interface with one or more other radio side enforcement points, performing (a) context and policy transfer during handover and (b) enhanced QoS/QoE enforcement. In some embodiments, the method may further comprise managing one or more of the RAN, transport network or virtual resources to enable QoS/QoE enforcement.

In some embodiments, the method may further comprise, in an instance in which the one or more enforcement points comprise an interface with the RAN, (a) collecting radio insight to enhance QoS/QoE enforcement point operation, or (b) dynamically programming the radio operation to support the QoS/QoE enforcement operation.

In some embodiments, the method may further comprise, in an instance in which the one or more enforcement points comprise an interface with the radio resource management ("radio C-plane"), performing QoS/QoE management or insight, application, or network driven radio resource management. In some embodiments, the method may further comprise providing an interface with traffic steering or traffic offload entities configured to support application or insight based traffic steering. In some embodiments, the method may further comprise providing an interface with the RAN configured to support application or insight based radio layer multi-connectivity.

In some embodiments, the method may further comprise handling the traffic in a current configuration, the traffic comprised of one or more service flows, detecting, while handling the traffic, an indication of a condition for which specific QoS and QoE management is required, wherein the condition comprises one of a change in the traffic or a change in resources or a status of the resources serving the traffic, defining at least one QoE/QoS target for each set of service flows requiring the QoS and QoE management, and in an instance in which the at least one QoE/QoS target requires a service different than a service provided in the current configuration, causing establishment of a sub-service flow configured to provide the service required by the at least one QoE/QoS target and further configured to carry a subset of the set of service flows requiring the specific QoS and QoE management.

In some embodiments, specific QoS and QoE management comprises identifying and enforcing a first policy of a plurality of policies, each of the plurality of policies comprising a particular set of one or more QoE parameters and associated values or ranges for the one or more QoE parameters, the one or more QoE parameters of each particular set being specific to a type of the traffic subject to the QoS and QoE management, the values or ranges, when enforced, ensuring good experience for an application or service vertical to which the values or ranges apply.

In some embodiments, the defining the at least one QoE/QoS target for each set of service flows requiring the QoS and QoE management further comprises accessing the particular set of one or more QoE parameters corresponding to the first policy and the associated values or ranges of the one or more QoE parameters, and identifying a specific value, from the associated values or ranges, for each of the one or more QoE parameters based on attributes or content of the service flow requiring the QoS and QoE management and attributes or content of the service flows competing for available capacity.

In some embodiments, causing establishment of the sub-service flow further comprises detecting whether the specific value of any of the one or more QoE parameters is unable to be met by a QoS level of the current configuration, and in in an instance in which the specific value of any of the one or more QoE parameters is unable to be met by the QoS level of the current configuration, causing establishment of a sub-service flow to carry the portion of the service flow for which the current configuration does not meet the specific value.

In some embodiments, the method may further comprise accessing the policy server before or subsequent to detection of the indication of the condition, and obtaining a set of policies, the set of policies comprising policies that describe default service to be applied on the traffic and one or more conditions requiring non-default service for a subset of the traffic.

In some embodiments, the condition is any of an establishment of a new service flow based on execution of an application, a change to an existing service flow based on a change in a type of interaction with a pre-executed application, congestion within the available resources, or a change in a service flow or set of service flows associated with a different device.

In some embodiments, the method may further comprise terminating the sub-service flow in an instance in which the subset of the set of service flows requiring the specific QoS and QoE management is no longer needed. In some embodiments, the method may further comprise identifying a set of flows that are subject of a given policy and requiring the QoS and QoE management. In some embodiments, the traffic is carried on the U-Plane.

In some embodiments a computer program product may be provided, comprising at least one non-transitory computer-readable storage medium having computer-executable program code instructions stored therein, the computer-executable program code instructions comprising program code instructions for performing any of the method steps provided above. In some embodiments, an apparatus may be provided, the apparatus comprising means for performing a method according any of the method steps provided above.

BRIEF DESCRIPTION OF THE DRAWINGS

Figure 1:
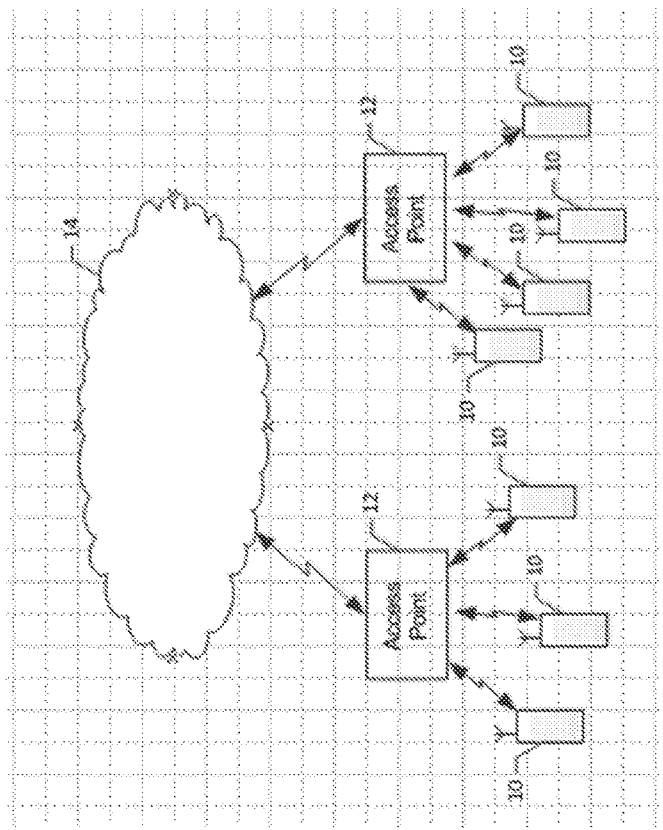
Figure 2:
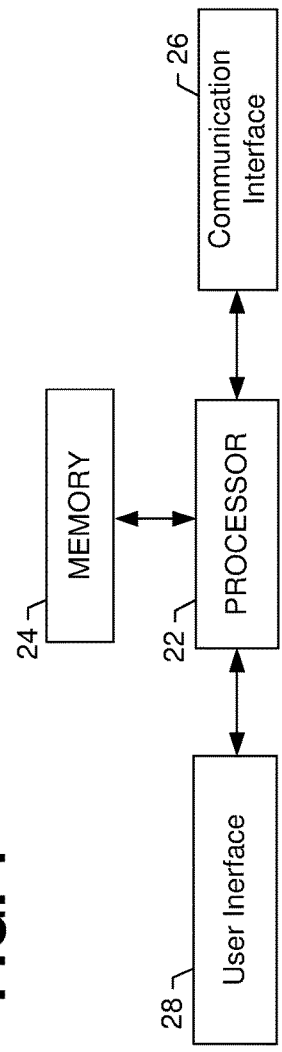
Figure 3:
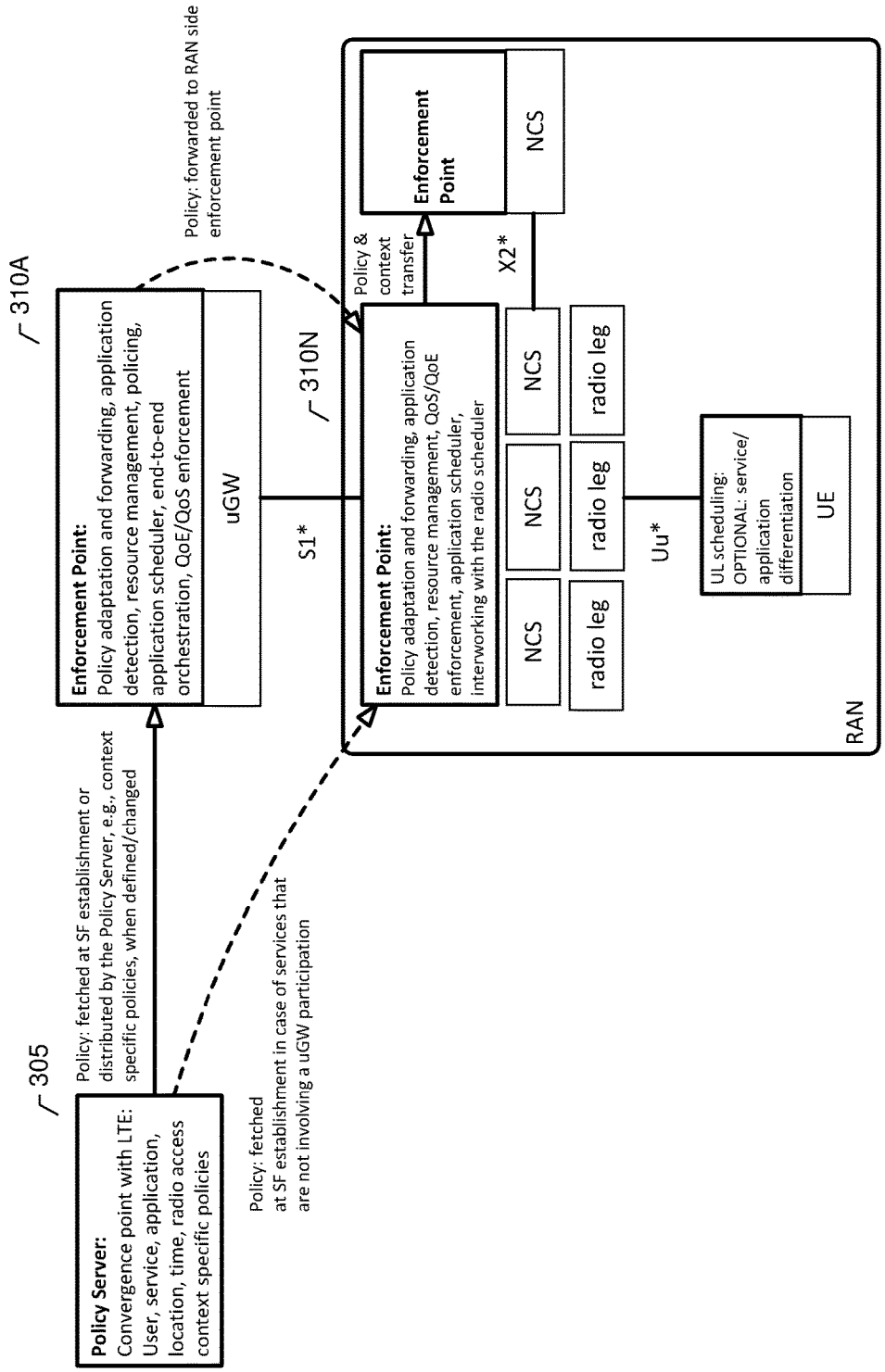
Figure 4:
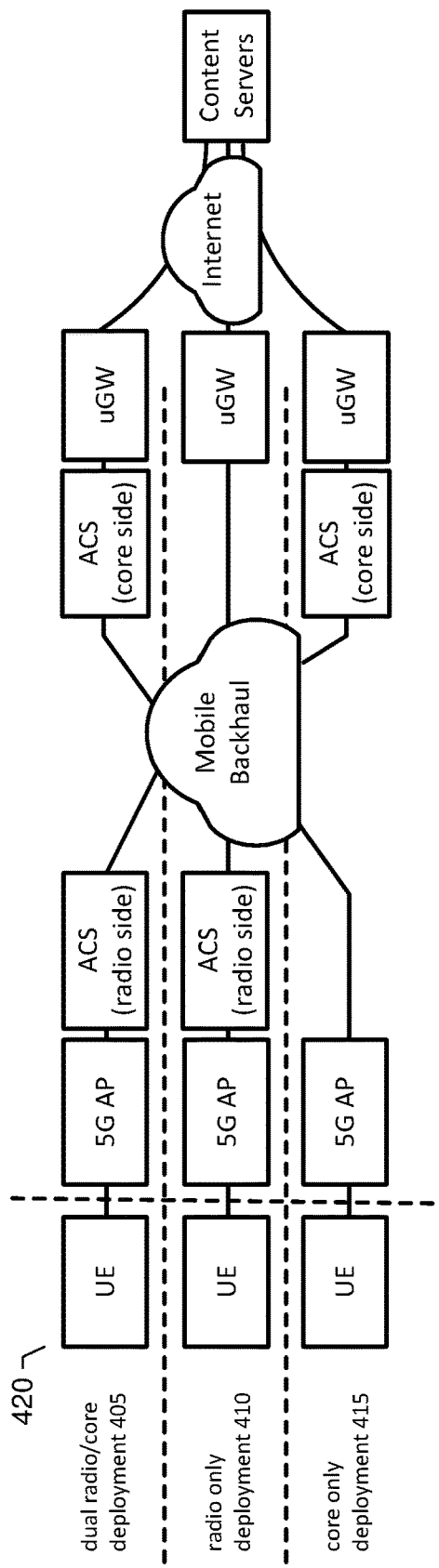
Figure 5:
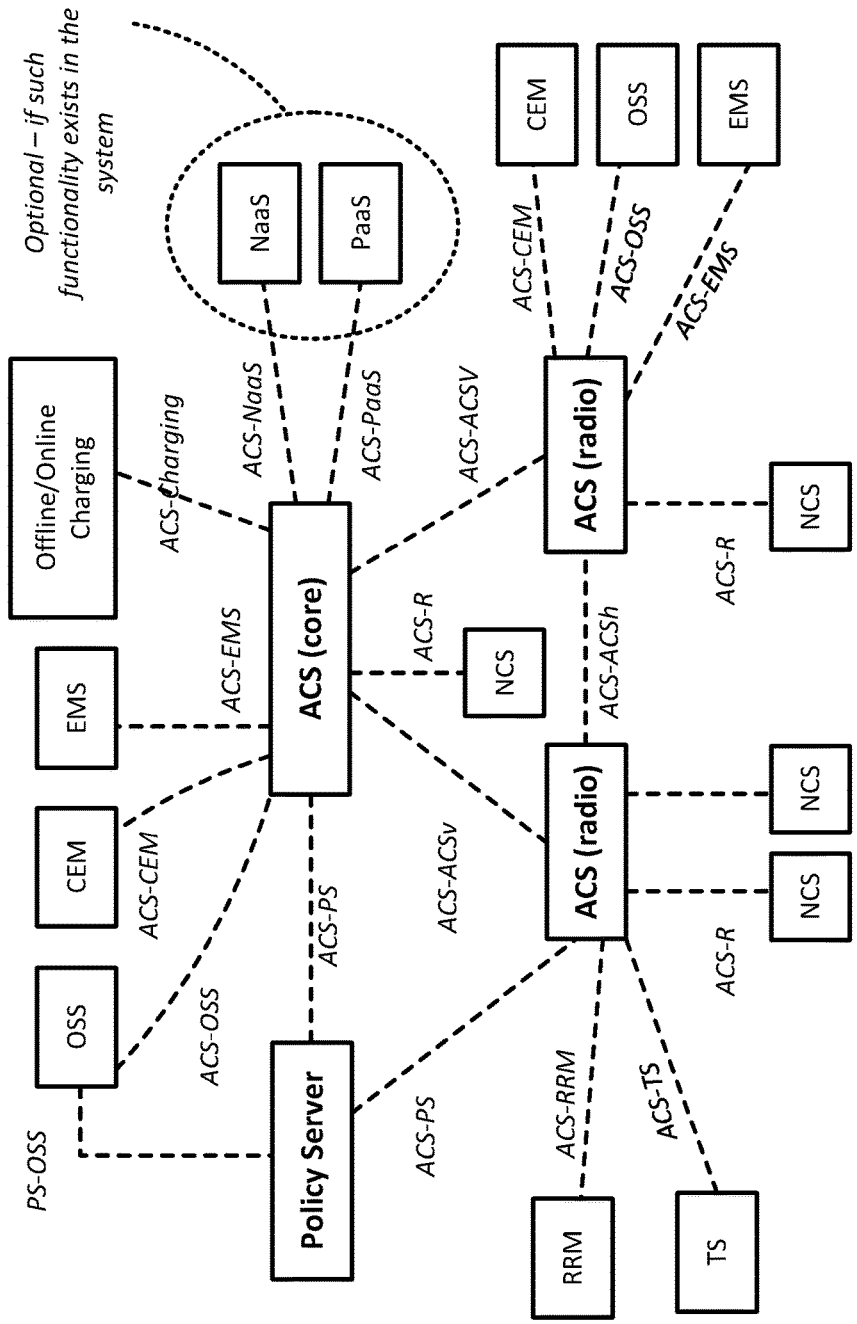
Figure 6:
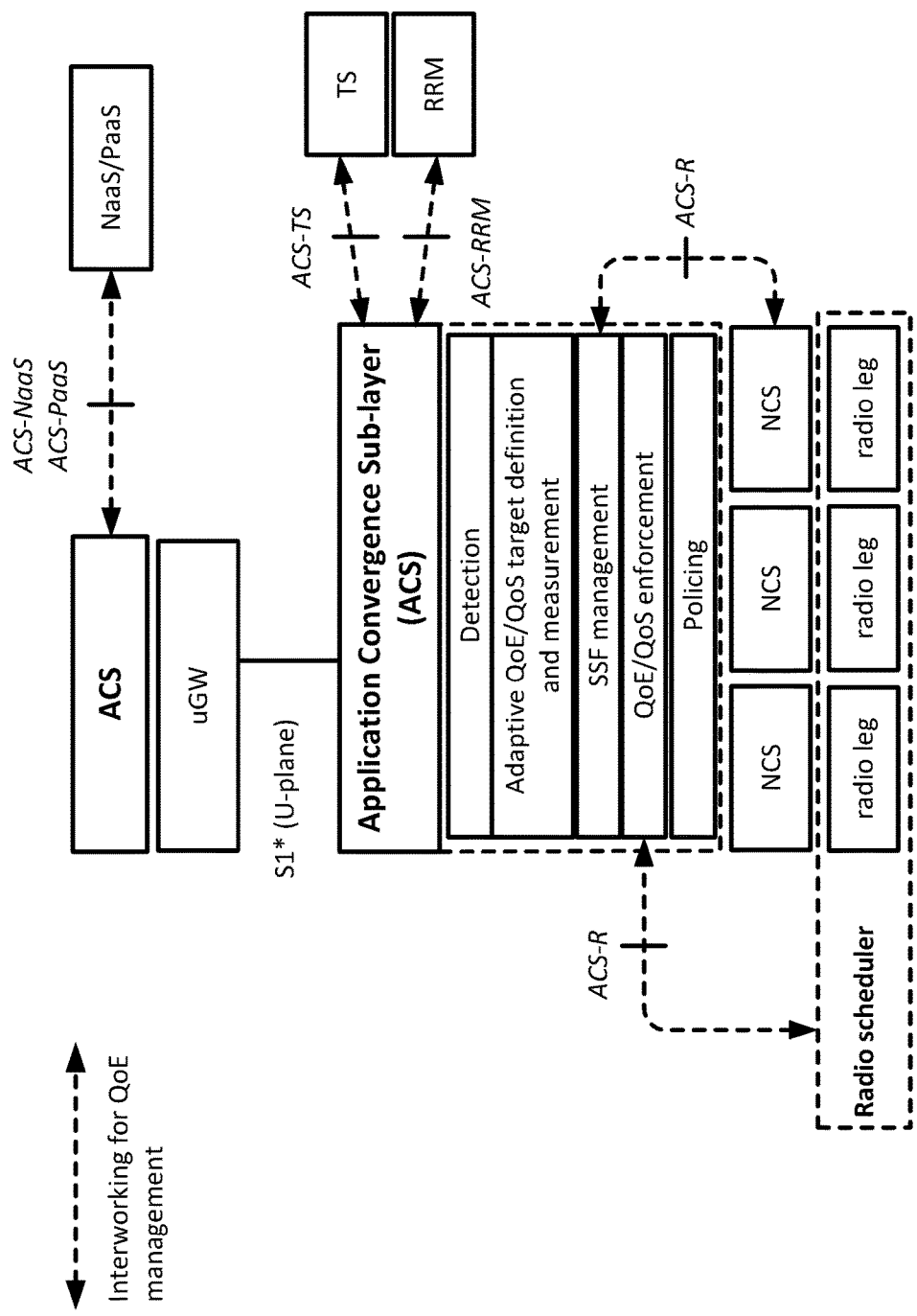
Figure 7:
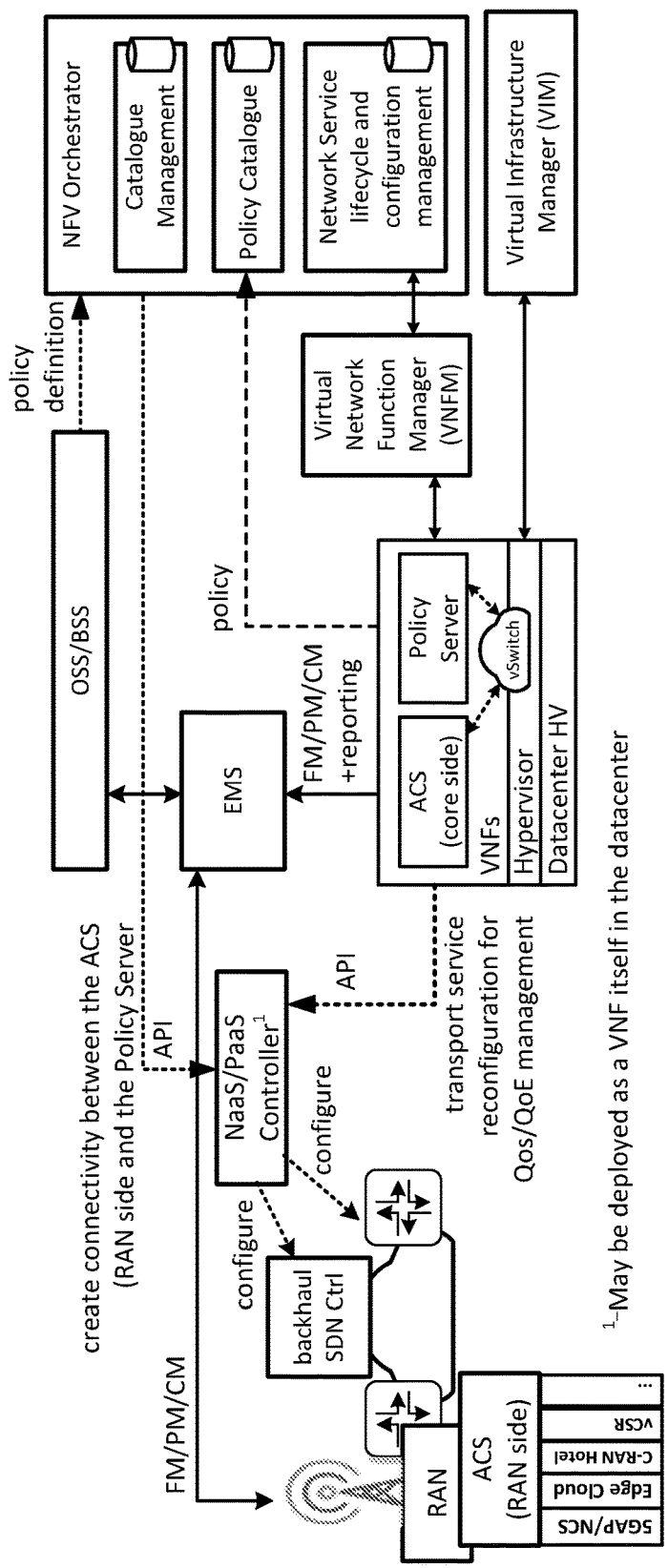
Figure 8:
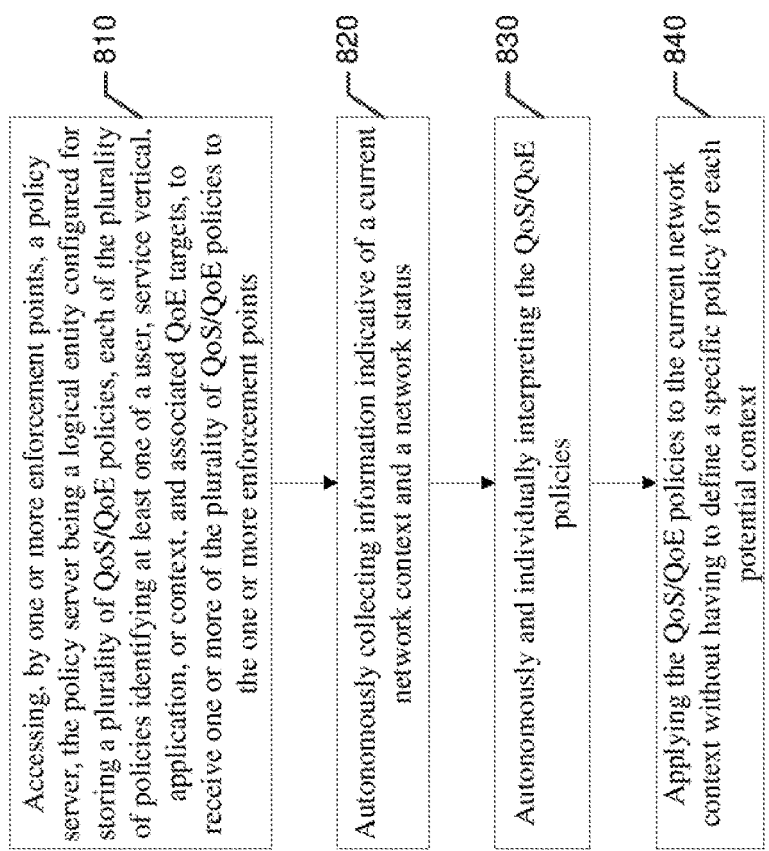
Figure 9:
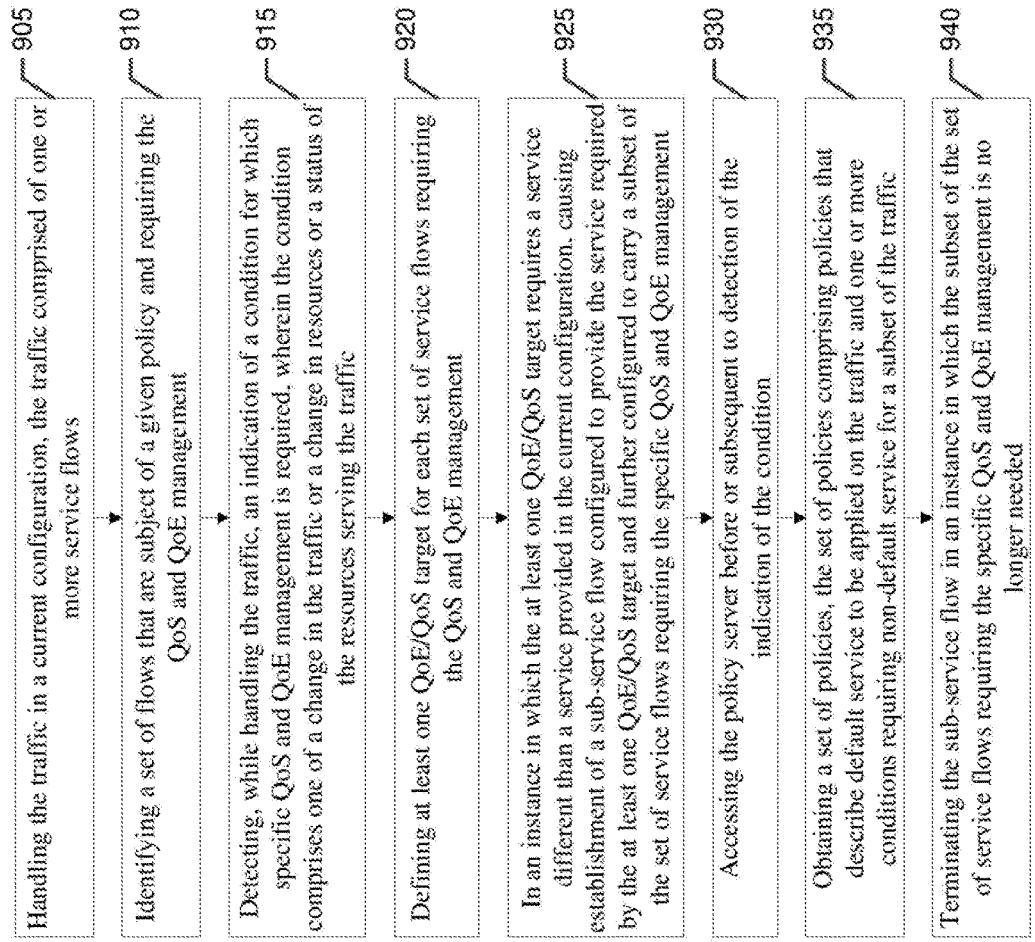

Having thus described embodiments of the invention in general terms, reference will now be made to the accompanying drawings, which are not necessarily drawn to scale, and wherein:

FIG. 1 is block diagram of a system that may be specifically configured in accordance with an example embodiment of the present invention;

FIG. 2 is a block diagram of an apparatus that may be specifically configured in accordance with an example embodiment of the present invention;

FIG. 3 is block diagram of a system that may be specifically configured in accordance with an example embodiment of the present invention;

FIG. 4 is block diagram of a system that may be specifically configured in accordance with an example embodiment of the present invention;

FIG. 5 is block diagram of a system that may be specifically configured in accordance with an example embodiment of the present invention;

FIG. 6 is block diagram of a system that may be specifically configured in accordance with an example embodiment of the present invention;

FIG. 7 is block diagram of a system that may be specifically configured in accordance with an example embodiment of the present invention; and FIGS. 8 and 9 show flowcharts of the exemplary operations performed by a method, apparatus and computer program product in accordance with an embodiment of the present invention.

DETAILED DESCRIPTION

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

As used herein, the term "circuitry" refers to all of the following: (a) hardware-only circuit implementations (such as implementations in only analog and/or digital circuitry); (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term 'circuitry' would also cover an implementation of merely a processor (or multiple processors) or portion of a processor and its (or their) accompanying software and/or firmware. The term 'circuitry' would also cover, for example and if applicable to the particular claim element, a baseband integrated circuit or application specific integrated circuit for a mobile phone or a similar integrated circuit in a server, a cellular network device, or other network device.

System Architecture

Referring now to FIG. 1, which illustrates an example system that supports communications between a plurality of stations 10 and one or more access points 12 (e.g., a high density system scenario where a plurality of access points may be deployed to a geographical area and may be operating on the same frequency channel), each access point may communicate with one or more stations and, in one embodiment, may communicate with a large number of stations, such as 6,000 or more stations. The access points may, in turn, communicate with a network 14. While the access points may communicate via an Long Term Evolution (LTE) or LTE-Advanced (LTE-A) network, other networks may support communications between the access points including those configured in accordance with wideband code division multiple access (W-CDMA), CDMA2000, global system for mobile communications (GSM), general packet radio service (GPRS), the IEEE 802.11 standard including, for example, the IEEE 802.11ah or 802.11ac standard or other newer amendments of the standard, wireless local access network (WLAN), Worldwide Interoperability for Microwave Access (WiMAX) protocols, universal mobile telecommunications systems (UMTS) terrestrial radio access network (UTRAN) and/or the like.

The access points 12 and the stations 10 may communicate via wireline communications, but most commonly communicate via wireless communications. For example, the access points and the stations may communicate in a sub 1 GHz band as defined by IEEE 802.11ah standard or in a 5 GHz band, which may be defined by, for example, IEEE 802.11ac standard. The access point may be embodied by any of a variety of network entities, such as an access point, a base station, a Node B, an evolved Node B (eNB), a radio network controller (RNC), a mobile device/a station (e.g., mobile telephones, smart phones, portable digital assistants (PDAs), pagers, laptop computers, tablet computers or any of numerous other hand held or portable communication devices, computation devices, content generation devices, content consumption devices, or combinations thereof), or the like. The stations may also be embodied by a variety of devices, such as sensors, meters or the like. The sensors and meters may be deployed in a variety of different applications including in utility applications to serve as a gas meter, a water meter, a power meter or the like, in environmental and/or agricultural monitoring applications, in industrial process automation applications, in healthcare and fitness applications, in building automation and control applications and/or in temperature sensing applications. Stations that are embodied by sensors or meters may be utilized in some embodiments to backhaul sensor and meter data. Alternatively, the stations may be embodied by mobile terminals or user equipment(s) (UE), such as mobile communication devices, e.g., mobile telephones, smart phones, portable digital assistants (PDAs), pagers, laptop computers, tablet computers or any of numerous other hand held or portable communication devices, computation devices, content generation devices, content consumption devices, or combinations thereof. In an embodiment in which the station is embodied by a mobile terminal, the communication between an access point and the station may serve to extend the range of wi-fi or another wireless local area network (WLAN), such as by extending the range of a hotspot, and to offload traffic that otherwise would be carried by a cellular or other network.

The access point 12 and/or the station 10 may be embodied as or otherwise include an apparatus 20 that is specifically configured to perform the functions of the respective device, as generically represented by the block diagram of FIG. 2. While the apparatus may be employed, for example, by an access point or a station, it should be noted that the components, devices or elements described below may not be mandatory and thus some may be omitted in certain embodiments. Additionally, some embodiments may include further or different components, devices or elements beyond those shown and described herein.

Apparatus Architecture

Regardless of the type of device that embodies the station 10, the station 10 may include or be associated with an apparatus 20 as shown in FIG. 2. In this regard, the apparatus may include or otherwise be in communication with a processor 22, a memory device 24, a communication interface 26 and a user interface 28. As such, in some embodiments, although devices or elements are shown as being in communication with each other, hereinafter such devices or elements should be considered to be capable of being embodied within the same device or element and thus, devices or elements shown in communication should be understood to alternatively be portions of the same device or element.

In some embodiments, the processor 22 (and/or co-processors or any other processing circuitry assisting or otherwise associated with the processor) may be in communication with the memory device 24 via a bus for passing information among components of the apparatus. The memory device may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the apparatus 20 to carry out various functions in accordance with an example embodiment of the present invention. For example, the memory device could be configured to buffer input data for processing by the processor. Additionally or alternatively, the memory device could be configured to store instructions for execution by the processor.

As noted above, the apparatus 20 may be embodied by a computing device 10 configured to employ an example embodiment of the present invention. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 22 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 22 may be configured to execute instructions stored in the memory device 24 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (e.g., a head mounted display) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor. In one embodiment, the processor may also include user interface circuitry configured to control at least some functions of one or more elements of the user interface 28.

Meanwhile, the communication interface 26 may be any means such as a device or circuitry embodied in either hardware or a combination of hardware and software that is configured to receive and/or transmit data between the computing device 10 and a server 12. In this regard, the communication interface 26 may include, for example, an antenna (or multiple antennas) and supporting hardware and/or software for enabling communications wirelessly. Additionally or alternatively, the communication interface may include the circuitry for interacting with the antenna(s) to cause transmission of signals via the antenna(s) or to handle receipt of signals received via the antenna(s). For example, the communications interface may be configured to communicate wirelessly with the head mounted displays 10, such as via Wi-Fi, Bluetooth or other wireless communications techniques. In some instances, the communication interface may alternatively or also support wired communication. As such, for example, the communication interface may include a communication modem and/or other hardware/software for supporting communication via cable, digital subscriber line (DSL), universal serial bus (USB) or other mechanisms. For example, the communication interface may be configured to communicate via wired communication with other components of the computing device.

The user interface 28 may be in communication with the processor 22, such as the user interface circuitry, to receive an indication of a user input and/or to provide an audible, visual, mechanical, or other output to a user. As such, the user interface may include, for example, a keyboard, a mouse, a joystick, a display, a touch screen display, a microphone, a speaker, and/or other input/output mechanisms. In some embodiments, a display may refer to display on a screen, on a wall, on glasses (e.g., near-eye-display), in the air, etc. The user interface may also be in communication with the memory 24 and/or the communication interface 26, such as via a bus.

Overview

1. High Level Architecture

As described with reference to FIG. 3, the high level architecture of the QoS/QoE management framework may comprise (1) a central Policy Server ("PS") 305 configured to store the user/service vertical/application and to some extent context (location, time, radio access, etc.) specific policies and operator preferences; and (2) one or more enforcement points 310A-N that perform QoS/QoE management by dynamically applying/enforcing the policies in the context of the actual user plane traffic, services, applications and network/resource status. Enforcement points 310A-N may require access to the user plane traffic for collecting user, service, application, network specific insight; for executing actions on the traffic itself; and for controlling the critical user plane system resources (such as radio and core network elements, transport infrastructure and services that can be either physical or virtual ones).

Each enforcement point 310A-N may derive its actions from the policies received/retrieved from the policy server 305. Each enforcement point 310A-N may referred to as an Application Convergence Sub-layer ("ACS"), an entity that logically groups functionalities related to QoS/QoE management and enforcement. Valid QoS/QoE architecture alternatives for the ACS may comprise: (a) dual radio/core deployment (both RAN and core side); (b) RAN side only; (c) core side only.

Deployment Options

FIG. 4 shows the ACS deployment options. Radio side ACS 425 and core side ACS 430 have different roles in the deployment alternatives. The radio side ACS 425 is positioned such that it can collect insight and have access to radio specific information. This location allows control and QoE driven allocation of resources thus it is able to efficiently manage the QoE in cooperation with the radio functions as well as manage traffic served locally without being routed through the core. The core side ACS 430 has a view of the core and mobile backhaul services and resources (including physical and virtual ones) thus it may be able to efficiently manage the QoE between itself and the UE especially on the transport network. The different roles may motivate the dual deployment with both radio and core side ACS 405. In some embodiments, embodiments such that enforcement points with only radio side ACS 410 (radio side enforcement points 405) or core side ACS 415 (core side enforcement points 410) may also be provided. For example, radio side enforcement points 405 may be motivated by network design such as very high capacity transport networks where only the radio access network may be a bottleneck, whereas core side enforcement points 410 may be motivated by lack of computation platforms in the RAN where the ACS can be deployed. Regardless, efficient operation may be reached with options 410 and 415 with the cost of extra analytics).

The UE 420 may have a role in supporting QoS/QoE management in the uplink ("UL") through scheduling and service/application differentiation. However, the level and scope of UE 420 support is not discussed within this invention. In any case, the network side QoS/QoE management framework should be capable of enforcing its targets as much as possible even with no UE 420 support whatsoever and it should be able to police UE 420 side actions in case of active QoS/QoE specific UE functions.

2. Interfaces and Integration Points

Internal and External Interfaces of the QoS/QoE Management Architecture

FIG. 5 shows the internal and external interfaces of the QoS/QoE management architecture. The internal and external interfaces of the QoS/QoE management architecture are depicted in FIG. 5 and their scope is explained below. The interfaces designate logical relationships between the ACS and the other components. Therefore, the peering entities from ACS point of view may vary according to the actual implementation.

PS-OSS (Policy Server interface with Operations Support Systems ("OSS")) provides operator policy provisioning and management.

ACS-PS (ACS interface with the Policy Server) provides policy transfer from the PS to the ACS.

ACS-EMS, ACS-CEM, ACS-OSS (ACS interface with the Element Management System ("EMS"), Customer Experience Management ("CEM") and OSS) provides tracing (i.e., reporting, logging), insight/KPI collection, configuration/management by OSS.

ACS-Charging (core side ACS interface to the online and offline charging systems) provides handling of the charging implications of ACS actions.

ACS-NaaS, ACS-PaaS (core side ACS interface to Network as a Service ("NaaS")/Platform as a Service ("PaaS") functions, if available) provides end-to-end network service management (including mobile backhaul network service management).

ACS-ACSv (vertical interface between the core side and radio side ACS if both are deployed) provides policy forwarding from the core side ACS to the radio side ACS.

ACS-ACSh (horizontal interface between radio side ACS instances) provides context and policy transfer during NCS handover in case the radio side ACS changes; and enhanced QoS/QoE enforcement in case of radio multi-connectivity.

ACS-TS (interface between the radio side ACS and Traffic Steering, load balancing, etc. functions) enables insight based TS/offload, load balancing and any high level and/or long term traffic management action. In some embodiments, the interface may also be terminated by the RRM functionality of the radio access point.

ACS-RRM (interface between the radio side ACS and the RRM) provides insight based radio resource management.

ACS-R (interface between the ACS and the radio stack) provides Sub-Service Flow ("SSF") management, per-SSF network parameter definition and U-plane packet to SSF mapping; and interworking with the radio scheduler. Note that depending on the radio scheduler implementation, the interface may be terminated by the RRM functionality.

3. Functional Description

The functional description discusses the requirements and scope of the policy framework and the QoS/QoE management and enforcement.

3.1 Policy Architecture

Conceptually, the Policy Server may be regarded as a functionality integrating selected legacy Home Subscriber Server ("HSS"), Subscriber Profile Repository ("SPR") and Policy and Charging Rules Function ("PCRF") functions whereas having new functionalities specialized in QoE management and dynamic QoS management that are beyond the scope and capability of the legacy PCC policy system. The role of the 5G policies is to provide the high level targets, service boundaries, preferences and priorities for the QoS/QoE management framework. The dynamic and context based enforcement responsibility is delegated to the QoS/QoE enforcement points. This is a fundamentally different policy approach than the one taken by the legacy PCC architecture favoring the micro-management of independent low granularity (often per-flow) limits and actions with little flexibility trusted to the Policy and Charging Enforcement Function ("PCEF").

The policies may be defined by the operator (e.g., may be part of service definition templates or subscriber databases). The Policy Server may then host the various levels of policies and provide the policies to the enforcement points.

The Policy Server may also act as a convergence point with LTE by mapping or converting between the LTE and 5G specific QoS parameters for those services that are supported by both LTE and 5G (e.g., mobile broadband) during inter-system handovers.

3.2. QoS/QoE Management and Enforcement Functions

The ACS (both at the radio and core network) may be regarded as integrating relevant capabilities of the legacy TDF, ADC, DPI and PCEF functions with extended capabilities not available or feasible with the predecessor standard components. The radio side ACS is introduced as a logical entity distinguished from the radio stack in order to enable orthogonal evolution separate from the radio interface and radio scheduler functionality.

On the U-plane, the ACS handles the traffic of one or more service flows. When a new service flow ("SF") is established, the ACS may obtain the relevant policies that describe both the service to be applied on the SF traffic by default as well as the subscription specific conditions (context, location, individual limits, applications important from customer experience perspective, etc.) to apply specialized treatment on all or a subset of the traffic.

Depending on its deployment, the ACS may be capable of taking over the management of the radio and/or transport network resources by redistributing them among the competing flows, applications, APs, RATs, etc. in a way that complies with the policies. Such action is required in case a bottleneck system resource becomes congested and its native resource management mechanism (such as packet scheduler) would not achieve the required traffic differentiation. Therefore, the ACS enforces the QoS/QoE targets and resolves congestion at the same time. The policies select the mode of operation and level of autonomy of the ACS:

- The ACS may accept customer experience level policies applying to the traffic generated by individual application sessions. The policies can be highly abstract (specifying only the desired outcome) but may also directly specify explicit parameters and target values to be achieved.
- The ACS can be instructed on network parameter and QoS level that applies to any traffic aggregation such as a service vertical, service flow, user, IP flow, individual packets, etc. The QoS targets may include packet level parameters (such as traditional delay, loss, jitter, bandwidth targets based on, e.g., subscriber SLA), network level fairness targets (e.g., among flows, UEs, RATs, etc.), general protocol layer healthiness/management targets (such as efficient TCP operation), etc.
- Selecting between the operation modes may be possible even on per-SF level, i.e., use QoE management for OTT applications and use SLA enforcement for M2M (or other service vertical).

The ACS enforces the requested QoS/QoE through internal functions (capabilities provided by direct U-plane manipulation) as well as through collaborative functions (by using the services of external 5G architectural network functions and components). QoS/QoE enforcement by the ACS is shown in FIG. 6 and described below.

3.2.1. Internal QoS/QoE Management Functions

On the user plane, the ACS (both at the radio/core side) may include one or more of the functionalities listed below. Note that these may not be independent but instead may be rather incremental functionalities, i.e., those enumerated later may build on the capabilities and services of earlier ones.

(1) Detection

The capability of autonomously detecting the conditions when all or part of the U-plane traffic of a UE/SF requires specific treatment (i.e., different from the default) to enforce the QoS/QoE targets specified by or derived from the policies. The conditions may include events within the traffic of the managed UE/SF itself (e.g., an application with specific QoE requirements is started or the user changes the way of interaction with the application) or within the real time context or status of the resources serving the user's traffic (e.g., congestion occurs, or there is a change in other UE's flows competing for the same resources). Detection may also include the ability to identify the set of flows that are subject of a given policy and need to be targeted by specific QoS/QoE management actions.

(2) Adaptive QoE/QoS Target Definition and Measurement

The ACS may define QoE/QoS targets for each set of U-plane flows that require specific treatment, for example, in some embodiments according to the detection function. The QoE targets may define the set of QoE parameters/metrics on an application session level (such as, for example, download time for web pages, video required bandwidth for video session, end-to-end latency per message transaction, etc.) and their corresponding target values/ranges that, when enforced, ensure good experience for the application/service vertical to which they apply. The set of relevant parameters/metrics may be specific to the kind of traffic that is subject of the QoE management (e.g., the application type such as HTTP(S) Adaptive Streaming/YouTube for OTT or the service vertical itself such as telco voice or M2M). The quantification of the target values may be context based and specific to the attributes/content of the individual application session (e.g., the required bandwidth is derived from the detected/profiled media rate of the specific video file) as well as the context of the network and the resources (e.g., based on the available radio capacity and the flows competing for the same radio resources).

The QoS targets specify simple parameters that can be enforced on the packet/flow level. The QoS parameters are calculated dynamically.

Where the defined QoE/QoS target requires a service that is different from that of the SF's default configuration, the ACS may trigger the establishment of a new SSF (which is described in more detail below) dedicated to the service of a subset of the SF's traffic.

(3) SSF management

Sub-Service Flows (SSF) are defined in 5G to enable a more granular U-plane service/flow differentiation beyond SF level differentiation. A SSF may correspond to one SF and may be a logical separation carrying a subset of the SF's traffic that requires dedicated QoS/QoE treatment.

SSF management functionality is configured to create, modify and terminate SSFs within a given SF. SSF creation/modification imply the definition of the initial QoS/QoE targets (or their redefinition) applicable to the traffic aggregate of the SSF.

(4) QoS/QoE enforcement

This function may consist of ACS-internal traffic management actions (including but not limited to, e.g., buffering, packet scheduling, protocol management and other mechanisms) with the scope of enforcing the QoS/QoE targets.

(5) Policing

The enforcement of non-QoE/-QoS related limits and service boundaries (such as UE level maximum bitrates), as mandated by policies. In some embodiments, this may be an optional function and even if present, may be restricted to either the core side or the radio side ACS, for example, when both are deployed.

The detection and action capabilities may be collapsed into the ACS to enable efficient and accurate operation, i.e., to be able to act in real time on the full insight collected by the ACS without having to transfer limited information to other locations such as, for example, running detection in the core and actions in the RAN, which has turned out to be problematic.

3.2.2. Collaborative QoS/QoE Management Functions

In some embodiments, the core side ACS may interwork with the network functions responsible for the transport network resource and service management in order to provide consistent end-to-end QoS/QoE. Accordingly, the ACS may trigger QoS/QoE driven end-to-end network service creation/reconfiguration (e.g., enabled by, for example, the ACS-NaaS/-PaaS interface). The scope of the function may include one or more of the following:

QoS/QoE enforcement and application/QoE aware resource allocation on the mobile backhaul.

Reconfiguration of the transport network services (e.g., increase the bandwidth allocation for a service that carries applications with operator defined or derived QoS/QoE targets).

Creation of transport services for specific SFs or SSFs with transport service parameters tailored to support the QoS/QoE requirements of the traffic mapped to the new service.

The ACS may be able to initiate application/QoE or QoS insight based Traffic Steering, Offload, load balancing and other high level traffic management functions (enabled by, for example, the ACS-TS interface).

Insight based radio resource management functions (enabled by, for example, the ACS-RRM interface) may include radio leg selection (for example, in the event of multi-radio availability) and insight based multi-connectivity establishment (e.g., detecting MPTCP on the U-plane may trigger switching on radio multi-connectivity to exploit the potential benefits of the U-plane transport protocol).

3.3. Supporting Functions

In some embodiments, policy transfer from core to radio side ACS may enable scalable policy dissemination in dual radio/core ACS deployments. In that case, the policies retrieved by the core ACS may be forwarded to the radio side ACS that increases the scalability of the ACS-PS interface. Additionally, the core ACS may apply filtering on the policies retrieved from the PS and only forward contextually relevant policies to the radio side ACS (e.g., policies not applicable to the current SF may be omitted). In case of radio/core only ACS deployment, the policies may be transferred from the PS to the existing (either radio or core) ACS instance.

Handover policy and context transfer may enable QoE continuity during NCS handover in the event that the ACS handling the traffic also changes. The transfer may convey all information from the source ACS (e.g., internal status including detection, QoE targets, policy interpretation, etc.) to the target ACS that enables replication and continuation of the behavior and operation of the source ACS on already established U-plane traffic.

Reporting the ACS may be required to provide traceability for its internal operation and to disclose U-plane QoE insight (e.g., QoS/QoE measurements, application/network insight, etc.) suitable to be used by OSS/BSS tools, offline analytics tools, CEM tools, customer care, network planning, etc. The function may be enabled by the ACS-CEM/-OSS/-EMS interfaces.

Management of the ACS as a network function may be integrated into the OSS management for CM/PM/FM.

Implementation of the 5G QoS/QoE Management Components and Interfaces

The following disclosure details various implementation aspects of the 5G QoS/QoE management components and interfaces as outlined in the previous section.

PS-ACS Interface

The PS-ACS interface may be configured to enable transfer of QoE/QoE management policies from the PS to the ACS, triggered by SF establishment. The policy transfer may be initiated by the PS (push mode) or requested by the ACS (pull mode). The transfer may be a transaction that is part of the C-plane SF signaling procedure or may be implemented as a standalone procedure. In the latter case, the initiating entity (PS or ACS) may be aware of the SF establishment itself.

ACS-Charging Interface

The ACS may perform actions that have charging implication as well as enable the implementation of advanced charging (e.g., application based charging, QoE/SLA based charging).

ACS-RRM Interface

The ACS may trigger U-plane and application/QoE insight based radio resource management or configuration. In an exemplary embodiments, detection of the usage of Multipath TCP and triggering of the setup of multi-connectivity on the radio so that the capabilities of the end-to-end U-plane transport protocol can be utilized efficiently.

The RRM may trigger the radio side ACS on SF establishment so that the ACS can initiate the policy transfer (in the event that it is implemented as a standalone procedure).

ACS-R Interface

The ACS-R interface may be established between the radio stack and the ACS that is closest to the radio in the deployment. In the event that a radio side ACS (with or without a core side ACS), the radio side ACS is the one terminating the ACS-R. In the event that there is only a core side ACS, this is the one terminating the interface.

The ACS may interwork with the radio stack so that the radio functions support the QoS/QoE targets defined by the ACS. The interworking may include the following capabilities:

SSF management and per-SSF network level parameter definition: The ACS may establish, update and/or terminate SSFs that are signaled to the radio stack. For each SSF, the ACS may define and pass network level parameters (e.g., QoS attributes and values) to the radio scheduler to be taken into account during TTI level radio resource allocation.

The ACS may be configured to map the U-plane packets to SSFs by means of a per-packet SSF identity indication (e.g., tunneling) towards the radio stack.

The radio scheduler may provide feedback to the ACS on the SSF level radio conditions/status as well as the overall resource status of the radio leg. The feedback may:

make the ACS adapt the per-SSF network level parameters (and also update them in the radio); and/or change the operation of the ACS internal enforcement mechanism.

Internal QoS/QoE Enforcement

The ACS may enforce the QoS/QoE on the per-SSF traffic aggregate internally by means of its Application Scheduler (AS) functionality. The AS may dynamically create per-SSF packet buffers and schedule the packets according to the corresponding QoS/QoE targets.

Deployment and Virtualization

The Policy Server and the ACS may be implemented as physical entities (standalone network elements or attached to existing nodes/functions) as well as in virtualized environments. In physical deployments, the ACS and PS may be implemented as standalone hardware/software ("HW"/"SW") elements or as SW components running on existing HW instances (e.g., on top of core GW implementations or radio AP HW/SW stack). In virtualized environments, Network Function Virtualization ("NFV") and Software Defined Network ("SDN") may have especially high relevance as they are considered as key technology enablers to create, configure, scale and manage services, resources and connectivity dynamically within VNFs both intra- and interdatacenters. The management and orchestration of NFV may be manifested and standardized as the ETSI MANO architecture, consisting of the OSS/BSS, NFVO, VNFM and VIM main components. The integration of the Policy Server and the ACS into this architecture is shown in FIG. 7.

FIG. 7 shows ACS and Policy Server integration with Network Function Virtualization Orchestration ("NVFO").

The integration of the Policy Server to the ETSI NFV reference architectural framework may comprise and/or require one or more of the following components and interfaces:

Central storage of the policies: the logical location for the storage may be a Policy Catalogue in the NVFO (similarly to storing the network catalogues).

Provide the operator with the capability to create and update policies: this may comprise and/or require a policy definition interface between the OSS/BSS and the NFVO.

The Policy Server itself may be implemented as a VNF running in a datacenter configured to synchronize with the NFVO catalogue. In some embodiments, there may be multiple instances of the Policy Server, each deployed in, for example, a different datacenter, including, in some embodiments, C-RAN hotels and MEC platforms. The distribution of the Policy Server functionality may enable efficient policy fetching also by radio side ACS instances during SF establishment.

In some embodiments, the core side ACS may be implemented as a VNF itself and run in a core datacenter along with additional VNFs such as virtual U-plane Gateway ("uGW"). The radio side ACS may be running on a 5G AP or in the radio cloud, possibly co-located with the implementation of the other RAN functions (including Network Convergence Sub-layer ("NCS") of L2 (similar to PDCP in LTE)).

The ACS may be part of the network service graphs for service verticals that comprise and/or in some embodiments require QoS/QoE management. During the instantiation of the service, the NFVO may create (or scale out) the required core and RAN side ACS instances (using, for example, the services of the VNFM, which may need to be extended with the capability of managing ACS VNFs). As part of the service instantiation, the NFVO may select the Policy Server to be used by the ACS and provides its identity/connectivity information as part of the ACS VNF configuration. The NVFO may also create the management plane connectivity between the ACS and the selected Policy Server through the NaaS/PaaS API (or, in some embodiments, the SDN controller API) to enable policy fetching during SF establishment.

The radio side ACS may be integrated with the NCS resulting in, for example, a collapsed ACS/NCS functionality. The potential benefit of such integration is the lower complexity/overhead and increased frequency of interworking. However, the integration may introduce limitations as well such as the flexibility of the ACS implementation and deployment.

Handover Policy and Context Transfer

According to the current under some embodiments, mobility in the 5G system may occur in multiple stages: NCS handover (i.e., radio handover, similarly to LTE handovers) or uGW relocation (i.e., changing the U-plane gateway serving the user's traffic).

After uGW relocation, the original uGW may be kept as the anchor point for ongoing U-plane flows/connections and only new connections may be established at the new uGW. Therefore, no flow level context transfer may take place during uGW relocation. In case of NCS handover, both context and status transfer from the serving (old) and target (new) NCS (and between the corresponding ACS instances) may be needed (See FIG. 6). Context may include information about the policies applicable to the UE, user and SF being handed over. Status may include the interpretation of the policies in the context of the detected applications, ongoing real time enforcement actions and their parameters, QoE targets, etc., which may be the result of monitoring the user plane packets passed through the serving NCS side ACS so far. The status transfer enables enforcement and QoE continuity between the sources and target NCS/ACS.

Operation

In an example embodiment of the present invention, an apparatus or computer program product may be provided to implement or execute a method, process, or algorithm for providing dynamic and adaptive quality of service (QoS) and Quality of Experience (QoE) management of traffic while implementing user and application specific differentiation and maximizing system resource utilization.

FIGS. 8 and 9 show flowcharts of the exemplary operations performed by a method, apparatus and computer program product in accordance with an embodiment of the present invention. It will be understood that each block of the flowcharts, and combinations of blocks in the flowcharts, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory 26 of an apparatus employing an embodiment of the present invention and executed by a processor 24 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowchart block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIGS. 8 and 9 when executed, convert a computer or processing circuitry into a particular machine configured to perform an example embodiment of the present invention. Accordingly, the operations of FIGS. 8 and 9 define an algorithm for configuring a computer or processing to perform an example embodiment. In some cases, a general purpose computer may be provided with an instance of the processor which performs the algorithms of FIGS. 8 and 9 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations herein may be modified or further amplified as described below. Moreover, in some embodiments additional optional operations may also be included as shown by the blocks having a dashed outline in FIGS. 8 and 9. It should be appreciated that each of the modifications, optional additions or amplifications below may be included with the operations above either alone or in combination with any others among the features described herein.

Facilitating the Process

In some example embodiments, a method, apparatus and computer program product may be configured for utilizing a system comprised of a policy server and one or more enforcement points. In some embodiments, the policy server may be a logical entity configured for storing a plurality of QoS/QoE policies, each of the plurality of policies identifying at least one of a user, service vertical, application, or context, and associated QoE targets. The policy server may be further configured to provide one or more of the plurality of QoS/QoE policies to the one or more enforcement points. In some embodiments, the QoS/QoE policies may be configured to provide QoE targets, for example, at a high abstraction level and at an application session level.

In some embodiments, the one or more enforcement points are configured for autonomously collecting information indicative of a current network context and a network status; and autonomously and individually interpreting the QoS/QoE policies, and applying the QoS/QoE policies to the current network context without having to define a specific policy for each potential context.

Operation

In some example embodiments, a method, apparatus and computer program product may be configured to provide dynamic and adaptive quality of service (QoS) and Quality of Experience (QoE) management of traffic while implementing user and application specific differentiation and maximizing system resource utilization by, for example, providing a policy server and one or more enforcement points, as described above. FIG. 8 is a flowchart showing an exemplary method of operating an example system in accordance with an embodiment of the present invention.

As such, as shown in block 810 of FIG. 8, an apparatus, such as apparatus 20 embodied by enforcement point 310A, may be configured to access a policy server to receive one or more of the plurality of QoS/QoE policies to the one or more enforcement points. The apparatus embodied by enforcement point 310A may therefore include means, such as the processor 22, the communication interface 26 or the like, for accessing a policy server to receive one or more of the plurality of QoS/QoE policies to the one or more enforcement points. As described above, in some embodiments, the policy server may be a logical entity configured for storing a plurality of QoS/QoE policies, each of the plurality of policies identifying at least one of a user, service vertical, application, or context, and associated QoE targets.

In some embodiments, the QoS/QoE policies may be configured to provide QoE targets, at for example, at least one of a high abstraction level or at an application session level. As shown in block 820 of FIG. 8, an apparatus, such as apparatus 20 embodied by enforcement point 310A, may be configured to autonomously collect information indicative of a current network context and a network status. The apparatus embodied by enforcement point 310A may therefore include means, such as the processor 22, the communication interface 26 or the like, for autonomously collecting information indicative of a current network context and a network status.

As shown in block 830 of FIG. 8, an apparatus, such as apparatus 20 embodied by enforcement point 310A, may be configured to autonomously and individually interpret the QoS/QoE policies. The apparatus embodied by enforcement point 310A may therefore include means, such as the processor 22, the communication interface 26 or the like, for autonomously and individually interpreting the QoS/QoE policies.

As shown in block 840 of FIG. 8, an apparatus, such as apparatus 20 embodied by enforcement point 310A, may be configured to apply the QoS/QoE policies to the current network context without having to define a specific policy for each potential context. The apparatus embodied by enforcement point 310A may therefore include means, such as the processor 22, the communication interface 26 or the like, for applying the QoS/QoE policies to the current network context without having to define a specific policy for each potential context.

In some example embodiments, a method, apparatus and computer program product may be further configured for providing dynamic and adaptive quality of service (QoS) and Quality of Experience (QoE) management of traffic by, for example, performing internal QoS/QoE management functions at the enforcement point. FIG. 9 is a flowchart showing an exemplary method of operating an example system in accordance with an embodiment of the present invention.

As shown in block 905 of FIG. 9, an apparatus, such as apparatus 20 embodied by the enforcement point 310A, may be configured to handle the traffic in a current configuration, the traffic comprised of one or more service flows. The apparatus embodied by enforcement point 310A may therefore include means, such as the processor 22, the communication interface 26 or the like, for handling the traffic in a current configuration, the traffic comprised of one or more service flows.

As shown in block 910 of FIG. 9, an apparatus, such as apparatus 20 embodied by the enforcement point 310A, may be configured to identify a set of flows that are subject of a given policy and requiring the QoS and QoE management. The apparatus embodied by enforcement point 310A may therefore include means, such as the processor 22, the communication interface 26 or the like, for identifying a set of flows that are subject of a given policy and requiring the QoS and QoE management.

As shown in block 915 of FIG. 9, an apparatus, such as apparatus 20 embodied by the enforcement point 310A, may be configured to detect, while handling the traffic, an indication of a condition for which specific QoS and QoE management is required. The apparatus embodied by enforcement point 310A may therefore include means, such as the processor 22, the communication interface 26 or the like, for detecting, while handling the traffic, an indication of a condition for which specific QoS and QoE management is required. In some embodiments, the condition comprises one of a change in the traffic or a change in resources or a status of the resources serving the traffic. In some embodiments, the condition is any of an establishment of a new service flow based on execution of an application, a change to an existing service flow based on a change in a type of interaction with a pre-executed application, congestion within the available resources, or a change in a service flow or set of service flows associated with a different device.

Once a condition is detected, QoE targets may be defined. As such, as shown in block 920 of FIG. 9, an apparatus, such as apparatus 20 embodied by the enforcement point 310A, may be configured to define at least one QoE/QoS target for each set of service flows requiring the QoS and QoE management. The apparatus embodied by enforcement point 310A may therefore include means, such as the processor 22, the communication interface 26 or the like, for defining at least one QoE/QoS target for each set of service flows requiring the QoS and QoE management. In some embodiments, defining the at least one QoE/QoS target for each set of service flows requiring the QoS and QoE management comprises accessing the particular set of one or more QoE parameters corresponding to the first policy and the associated values or ranges of the one or more QoE parameters and identifying a specific value, from the associated values or ranges, for each of the one or more QoE parameters based on attributes or content of the service flow requiring the QoS and QoE management and attributes or content of the service flows competing for available capacity.

In some embodiments, in an instance in which the at least one QoE/QoS target requires a service different than a service provided in the current configuration, a sub-service flow may be established. As such, as shown in block 925 of FIG. 9, an apparatus, such as apparatus 20 embodied by the enforcement point 310A, may be configured to cause establishment of a sub-service flow. The apparatus embodied by enforcement point 310A may therefore include means, such as the processor 22, the communication interface 26 or the like, for causing establishment of a sub-service flow. In some embodiments, the sub-service flow may be configured to provide the service required by the at least one QoE/QoS target and further configured to carry a subset of the set of service flows requiring the specific QoS and QoE management.

In some embodiments, the establishment of the sub-service flow may comprise detecting whether the specific value of any of the one or more QoE parameters is unable to be met by a QoS level of the current configuration and, in in an instance in which the specific value of any of the one or more QoE parameters is unable to be met by the QoS level of the current configuration, causing establishment of a sub-service flow to carry the portion of the service flow for which the current configuration does not meet the specific value.

As shown in block 930 of FIG. 9, an apparatus, such as apparatus 20 embodied by the enforcement point 310A, may be configured to access the policy server before or subsequent to detection of the indication of the condition. The apparatus embodied by enforcement point 310A may therefore include means, such as the processor 22, the communication interface 26 or the like, for accessing the policy server before or subsequent to detection of the indication of the condition.

As shown in block 935 of FIG. 9, an apparatus, such as apparatus 20 embodied by the enforcement point 310A, may be configured to obtain a set of policies, the set of policies comprising policies that describe default service to be applied on the traffic and one or more conditions requiring non-default service for a subset of the traffic. The apparatus embodied by enforcement point 310A may therefore include means, such as the processor 22, the communication interface 26 or the like, for obtaining a set of policies, the set of policies comprising policies that describe default service to be applied on the traffic and one or more conditions requiring non-default service for a subset of the traffic.

As shown in block 940 of FIG. 9, an apparatus, such as apparatus 20 embodied by the enforcement point 310A, may be configured to terminate the sub-service flow in an instance in which the subset of the set of service flows requiring the specific QoS and QoE management is no longer needed. The apparatus embodied by enforcement point 310A may therefore include means, such as the processor 22, the communication interface 26 or the like, for terminating the sub-service flow in an instance in which the subset of the set of service flows requiring the specific QoS and QoE management is no longer needed.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

APPENDIX A

List of Abbreviations

ACS Application Convergence Sub-layer
ADC Application Detection and Control
AP Access Point
ASP Application Service Provider
AS Application Scheduler
BI Business Intelligence
BSS Business Support Systems
CDN Content Delivery Network
CEM Customer Experience Management
CM Configuration Management
cmW Centimeter Wave
CN Core Network
C-RAN Cloud RAN
DL Downlink
DoS Denial of Service
DPI Deep Packet Inspection
DSCP Differentiated Services Code Point
EMS Element Management System
FM Fault Management
HSS Home Subscriber Server
HTTP Hypertext Transfer Protocol HTTPS HTTP Secure
IoT Internet of Things
IP Internet Protocol
LTE Long Term Evolution
LTE-ALTE Advanced
M2M Machine to Machine
MAC Media Access Control
MC Multi-Connectivity
mmW Millimeter Wave
MPTCP Multipath TCP
NaaS Network as a Service
NCS Network Convergence Sub-layer of L2 (similar to PDCP in LTE)
NFVO Network Function Virtualization Orchestration
NSG Network Service Graph
OSS Operations Support Systems
OTT Over The Top
PaaS Platform as a Service
PCEF Policy and Charging Enforcement Function
PCRF Policy and Charging Rules Function
PDCP Packet Data Convergence Protocol
PM Performance Management
QoE Quality of Experience
QoS Quality of Service
RAN Radio Access Network
RCS Radio Convergence Sub-layer of L2
RRC Radio Resource Control
SDN Software Defined Networking
SDU Service Data Unit
SF Service Flow
SLA Service Level Agreement
SPR Subscriber Profile Repository
SSF Sub-Service Flow
TCP Transmission Control Protocol
TDF Traffic Detection Function
TFT Traffic Flow Template
TS Traffic Steering
TTI Transmission Time Interval
UE User Equipment
UL Uplink
uGW U-plane Gateway
vCSR virtual Cell Site Router
VM Virtual Machine
VNF Virtual Network Function
VNFM VNF Manager
WA Wide Area

We claim:

1. A method for providing dynamic and adaptive quality of service (QoS) and Quality of Experience (QoE) management of traffic while implementing user and application specific differentiation and maximizing system resource utilization, the method comprising:
   accessing, by one or more enforcement points, a policy server, the policy server being a logical entity configured for storing a plurality of QoS/QoE policies, each of the plurality of policies identifying at least one of a user, service vertical, application, or context, and associated QoE targets, to receive one or more of the plurality of QoS/QoE policies for the one or more enforcement points,
   wherein the QoS/QoE policies are configured to provide, at a high abstraction level and at an application session level, QoE targets,
   autonomously collecting information indicative of a current network context and a network status; and
   autonomously and individually interpreting the QoS/QoE policies; and
   applying the QoS/QoE policies to the current network context without having to define a specific policy for each potential context.

2. The method according to claim 1, wherein at least one of the one or more enforcement points is located in a core network or core side enforcement points, in a radio area network (RAN) or radio side enforcement points, or in both the core network and the RAN.

3. The method according to claim 1, further comprising, utilizing an interface with the policy server to perform policy transfer from the policy server to the enforcement points.

4. The method according to claim 2, further comprising, in an instance in which the one or more enforcement points is located in the core network and RAN, utilizing an interface to perform policy forwarding from the core network to the RAN.

5. The method according to claim 2, further comprising, in an instance in which the radio side enforcement points comprise an interface with one or more other radio side enforcement points, performing (a) context and policy transfer during handover and (b) enhanced QoS/QoE enforcement.

6. The method according to claim 2, further comprising:
   managing one or more of the RAN, transport network or virtual resources to enable QoS/QoE enforcement.

7. The method according to claim 2, further comprising, in an instance in which the one or more enforcement points comprise an interface with the RAN, (a) collecting radio insight to enhance QoS/QoE enforcement point operation; or (b) dynamically programming radio operation to support the QoS/QoE enforcement operation.

8. The method according to claim 2, further comprising, in an instance in which the one or more enforcement points comprise an interface with the radio resource management or radio C-plane, performing QoS/QoE management or insight, application, or network driven radio resource management.

9. The method according to claim 2, further comprising providing an interface with traffic steering or traffic offload entities configured to support application or insight based traffic steering.

10. The method according to claim 2, further comprising providing an interface with the RAN configured to support application or insight based radio layer multi-connectivity.

11. The method according to claim 2, further comprising:
   handling the traffic in a current configuration, the traffic comprised of one or more service flows;
   detecting, while handling the traffic, an indication of a condition for which specific QoS and QoE management is required, wherein the condition comprises one of a change in the traffic or a change in resources or a status of the resources serving the traffic;
   defining at least one QoE/QoS target for each set of service flows requiring the QoS and QoE management; and
   in an instance in which the at least one QoE/QoS target requires a service different than a service provided in the current configuration, causing establishment of a sub-service flow configured to provide the service required by the at least one QoE/QoS target and further configured to carry a subset of the set of service flows requiring the specific QoS and QoE management.

12. The method according to claim 11, wherein specific QoS and QoE management comprises: identifying and enforcing a first policy of a plurality of policies, each of the plurality of policies comprising a particular set of one or more QoE parameters and associated values or ranges for the one or more QoE parameters, the one or more QoE parameters of each particular set being specific to a type of the traffic subject to the QoS and QoE management, the values or ranges, when enforced, ensuring good experience for an application or service vertical to which the values or ranges apply.

13. The method according to claim 12, wherein the defining the at least one QoE/QoS target for each set of service flows requiring the QoS and QoE management further comprises:
   accessing the particular set of one or more QoE parameters corresponding to the first policy and the associated values or ranges of the one or more QoE parameters; and
   identifying a specific value, from the associated values or ranges, for each of the one or more QoE parameters based on attributes or content of a service flow requiring the QoS and QoE management and attributes or content of the service flows competing for available capacity.

14. The method according to claim 13, wherein causing establishment of the sub-service flow further comprises:
   detecting whether the specific value of any of the one or more QoE parameters is unable to be met by a QoS level of the current configuration; and
   in an instance in which the specific value of any of the one or more QoE parameters is unable to be met by the QoS level of the current configuration, causing establishment of a sub-service flow to carry the portion of the service flow for which the current configuration does not meet the specific value.

15. The method according to claim 11, further comprising:
   accessing the policy server before or subsequent to detection of the indication of the condition; and
   obtaining a set of policies, the set of policies comprising policies that describe default service to be applied on the traffic and one or more conditions requiring non-default service for a subset of the traffic.

16. The method according to claim 11, wherein the condition is any of any of an establishment of a new service flow based on execution of an application, a change to an existing service flow based on a change in a type of interaction with a pre-executed application, congestion within the available resources, or a change in a service flow or set of service flows associated with a different device.

17. The method according to claim 11, further comprising:
   terminating the sub-service flow in an instance in which the subset of the set of service flows requiring the specific QoS and QoE management is no longer needed.

18. The method according to claim 11, further comprising:
   identifying a set of flows that are subject of a given policy and requiring the QoS and QoE management.

19. The method according to claim 11, wherein the traffic is carried on a U-Plane.

20. An apparatus for providing dynamic and adaptive quality of service (QoS) and Quality of Experience (QoE) management of traffic while implementing user and application specific differentiation and maximizing system resource utilization, the apparatus comprising at least one processor and at least one memory including computer program code, the at least one memory and the computer program code configured to, with the processor, cause the apparatus to at least:
   access, by one or more enforcement points, a policy server, the policy server being a logical entity configured for storing a plurality of QoS/QoE policies, each of the plurality of policies identifying at least one of a user, service vertical, application, or context, and associated QoE targets, to receive one or more of the plurality of QoS/QoE policies for the one or more enforcement points,
   wherein the QoS/QoE policies are configured to provide, at a high abstraction level and at an application session level, QoE targets,
   autonomously collect information indicative of a current network context and a network status;
   autonomously and individually interpret the QoS/QoE policies; and
   apply the QoS/QoE policies to the current network context without having to define a specific policy for each potential context.

21. A computer program product configured for providing dynamic and adaptive quality of service (QoS) and Quality of Experience (QoE) management of traffic while implementing user and application specific differentiation and maximizing system resource utilization, the computer program product comprising at least one non-transitory computer readable storage medium having computer-executable program code instructions stored therein, the computer-executable program code instructions comprising program code instructions for:
   accessing, by one or more enforcement points, a policy server, the policy server being a logical entity configured for storing a plurality of QoS/QoE policies, each of the plurality of policies identifying at least one of a user, service vertical, application, or context, and associated QoE targets, to receive one or more of the plurality of QoS/QoE policies for the one or more enforcement points,
   wherein the QoS/QoE policies are configured to provide, at a high abstraction level and at an application session level, QoE targets,
   autonomously collecting information indicative of a current network context and a network status;
   autonomously and individually interpreting the QoS/QoE policies; and
   applying the QoS/QoE policies to the current network context without having to define a specific policy for each potential context.

* * * * *